(12) United States Patent
Smith et al.

(10) Patent No.: US 6,322,764 B1
(45) Date of Patent: Nov. 27, 2001

(54) PREPARATION OF PHOSPHORUS PENTAFLUORIDE

(75) Inventors: W. Novis Smith; Joel McCloskey, both of Philadelphia, PA (US)

(73) Assignee: Lithdyne LLC, Anaheim, CA (US)

( * ) Notice: Subject to any disclaimer, the term of this patent is extended or adjusted under 35 U.S.C. 154(b) by 0 days.

(21) Appl. No.: 09/375,791

(22) Filed: Aug. 17, 1999

(51) Int. Cl.[7] .................................................. C01B 25/10

(52) U.S. Cl. .............................................. 423/301

(58) Field of Search ............................... 423/301

(56) References Cited

U.S. PATENT DOCUMENTS

| 2,488,298 | * | 11/1949 | Lange | ..................... | 423/308 |
| 3,584,999 | * | 6/1971 | Wiesboeck | ............................. | 423/301 |
| 3,634,034 | * | 1/1972 | Nickerson | ............................ | 423/301 |
| 4,202,867 | * | 5/1980 | Cannon | ................................ | 423/301 |

* cited by examiner

Primary Examiner—Steven P. Griffin
Assistant Examiner—Maribel Medina
(74) Attorney, Agent, or Firm—John Lezdey & Assoc

(57) ABSTRACT

A process for the preparation of anhydrous high purity phosphorus pentafluoride in high yield. The process uses an excess of hydrogen fluoride in a reaction with a phosphoric acid to form hexafluorophosphoric acid followed by reaction with a sulfur based acid reactant in a reaction medium containing an excess of hydrogen fluoride.

18 Claims, 1 Drawing Sheet

PREPARATION OF PHOSPHORUS PENTAFLUORIDE

BACKGROUND FOR THE INVENTION

1. Field of the Invention

This invention relates to the preparation of anhydrous high purity phosphorus pentafluoride in high yield.

2. Description of the Prior Art

Known processes for the production of phosphorus pentafluoride include:

1. A phosphorus pentachloride halogen exchange reaction with arsenic trifluoride, $$3PCl_5+5AsF_3 \rightarrow 3PF_5+5AsCl_3;$$

2. The chlorination of phosphorus trifluoride, $$5PF_3+3Cl_2 \rightarrow 3PF_5+2PCl_3;$$

3. Phosphoryl fluoride reacting with hydrogen fluoride, $$POF_3+2HF \rightarrow PF_5+H_2O;$$

4. Heating a metal fluoride, a phosphoric acid or monofluoro-phosphoric acid and sulfur trioxide;

$$2H_3PO_4+6SO_3+6\ CaF_2 \rightarrow PF_5+HPF_6.2H_2O+HF\ 7+6\ CaSO_4;$$

5. Phosphorus pentachloride reaction with hydrogen fluoride, $$PCl_5+5HF \rightarrow PF_5+5HCl.$$

The first three processes are described in U.S. Pat. No. 3,584,999 to Wiesboeck. The halogen exchange and the chlorofluorination processes require extensive fractionation to separate mixed halides ($PClF_4$, $PCl_2F_3$), HCl, inter alia from the desired end product, phosphorus pentafluoride. The last process is disclosed in U.S. Pat. No. 3,634,034 to Nickerson and Wiesboeck, which produces along with phosphorus pentafluoride, hexafluorophosphoric acid and calcium sulfate. Separation problems and disposal of large amounts of calcium sulfate are problems which must be addressed with this process. Finally, the reaction involving phosphorus pentachloride and hydrogen fluoride (equation 5) also requires special techniques of separation for undesirable by-products.

Therefore, there exists a need to provide high purity phosphorus pentafluoride in a simple and economical procedure without the need for extensive fractionation or high pressure equipment and not to have extensive acid gases present which require special disposal.

SUMMARY OF THE INVENTION

In accordance with the present invention, high purity phosphorus pentafluoride can be produced in high yield without resorting to complex process operations. The critical feature of the present invention is effecting the reaction of hexafluorophosphoric acid with a sulfur based acid reactant selected from the group consisting essentially of fuming sulfuric acid (oleum), sulfur trioxide per se, fluorosulfonic acid and mixtures thereof in a reaction medium comprising hydrogen fluoride to form high purity phosphorus pentafluoride in yields of 65 to 100 weight percent (based on contained phosphorus). The yield based on fluoride content is also calculated to be about 90 to 99 percent. Preferably the process is conducted under a dry atmosphere, at autogenous pressures and moderate temperatures.

In one preferred embodiment the process involves a two step process: first preparing hexafluorophosphoric acid by effectively reacting phosphoric acid with a stoichiometric excess of anhydrous hydrogen fluoride and then in the second step, effectively reacting the so formed hexafluorophosphoric acid with fuming sulfuric acid or sulfur trioxide in a reaction medium comprising the unreacted excess hydrogen fluoride from the first reaction step. All fluoride containing compounds other than the phosphorus pentafluoride product may be recycled to the reactor.

More specifically in a preferred embodiment, the process for producing phosphorus pentafluoride according to the invention comprises the steps of:

a) adding an excess of anhydrous hydrogen fluoride above a stoichiometric amount to polyphosphoric acid to effect reaction in a preferably dry atmosphere to form hexafluorophosphoric acid in the unreacted excess of hydrogen fluoride; and then b) reacting the hexafluorophosphoric acid with fuming sulfuric acid while in contact with the unreacted excess of hydrogen fluoride to form substantially pure phosphorus pentafluoride; and c) recovering phosphorus pentafluoride, hydrofluoric acid and sulfuric acid.

Optionally, the recovered hydrofluoric acid may be recycled or added to supplement the amount of hydrogen fluoride to be used in the next preparation batch in the first step of the process or as the reaction medium in the second step.

Alternatively, in another preferred embodiment, hexafluorophosphoric acid can be used as the starting material and effectively reacted with a stoichiometric amount or less than a stoichiometric amount required of a sulfur based acid reactant selected from the group consisting essentially of sulfur trioxide, fuming sulfuric acid, fluorosulfonic acid and mixtures thereof in a reaction medium of hydrogen fluoride to produce high purity phosphorus pentafluoride in high yield.

It is, therefore, an object of the present invention to provide an improved process for the preparation of high purity phosphorus pentafluoride in high yield.

Another related object of the present invention is to provide a process which is highly efficient and economical.

A further object of the present invention is to provide a process which produces a minimum amount of hydrofluoric acid by-product.

An associated object of the present invention is to provide a process which results in an industrial grade sulfuric acid which can be recycled.

Further objects and embodiments of the process of this invention will be more readily apparent from the following description of the accompanying drawing and detailed description.

BRIEF DESCRIPTION OF THE DRAWING

The FIGURE is a graph showing the relationship between the amount of excess over the stoichiometric amount of hydrogen fluoride in the reaction medium involving hexafluorophosphoric acid with fuming sulfuric acid as reactants and the yield of phosphorus pentafluoride in the process of the present invention.

DETAILED DESCRIPTION OF THE PREFERRED EMBODIMENTS

Figure 1:
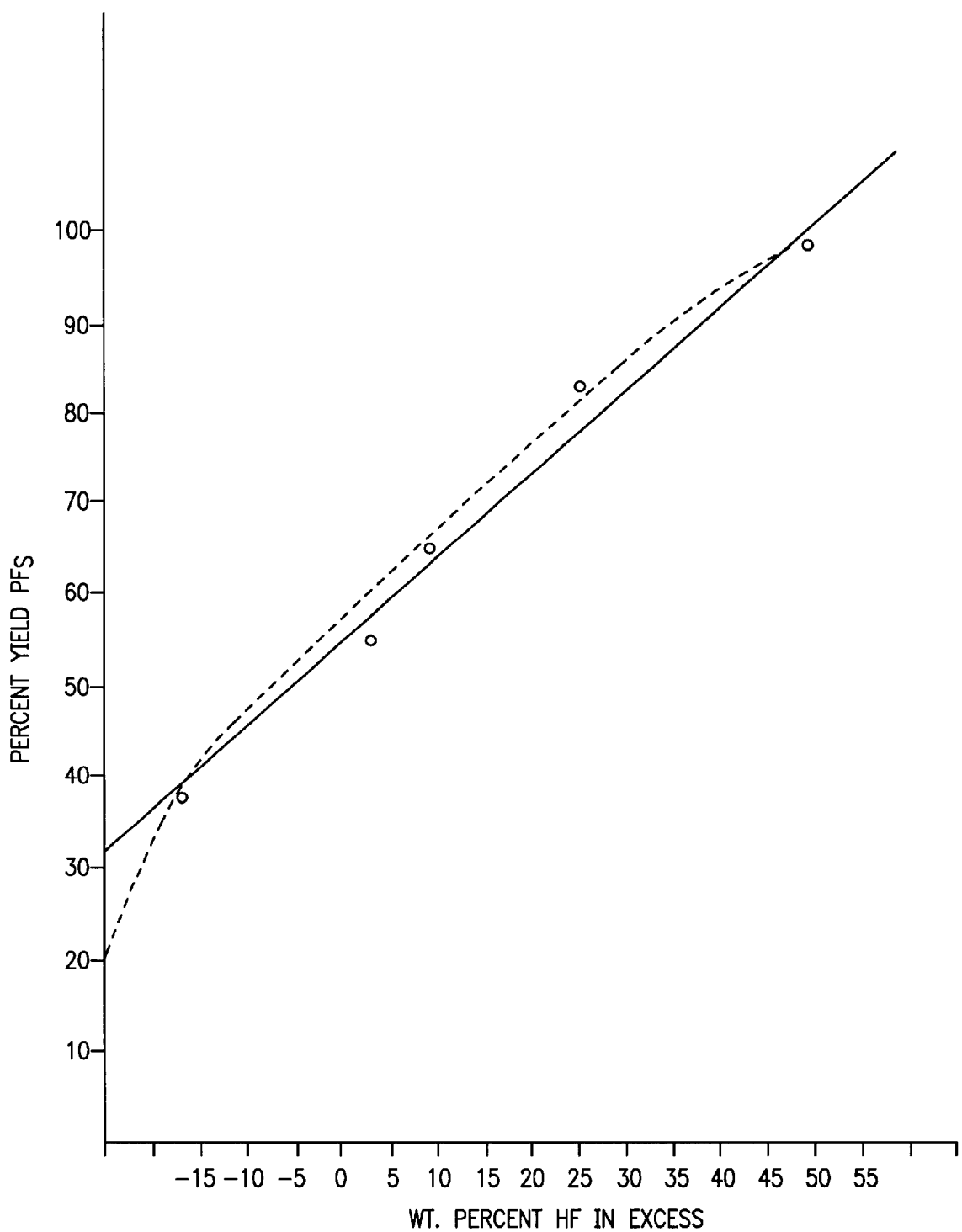

The present invention is applicable to a process for the production of phosphorus pentafluoride which involves hexafluorophosphoric acid either as a starting reactant or as an intermediate. The invention is first described in the context of a preferred process for such production in which the hexafluorophosphoric acid is produced as an intermediate.

This embodiment of the present process comprises two essential reaction steps: The first reaction step involves the formation of a more concentrated hexafluorophosphoric acid and the second reaction step relates to the production of high purity phosphorus pentafluoride.

The theoretically required quantity of fluoride necessary for the complete transformation of a phosphorus acid compound into the hexafluorophosphoric acid $HPF_6$ is available when the materials are present in a ratio corresponding to 6 atoms of fluorine per atom of phosphorus.

In the first reaction step an excess of anhydrous hydrogen fluoride which may range from 9 to 100% of the stoichiometric amount is reacted with polyphosphoric acid (PPA) to form hexafluorophosphoric acid and a smaller amount of water by-product, as shown by the following equation:

$$6HF+117\% \; H_3PO_4+xsHF \rightarrow HPF_6+3.4\;H_2O+xsHF \quad xs=excess$$

When orthophosphoric acid is used, the number of moles of water formed is slightly higher as shown by the equation:

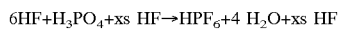
$$6HF+H_3PO_4+xs\;HF \rightarrow HPF_6+4\;H_2O+xs\;HF$$

The second reaction step consists in mixing the hexafluorophosphoric acid and an excess of anhydrous hydrogen fluoride with fuming sulfuric acid to form phosphorus pentafluoride of high purity and is illustrated by the following equation:

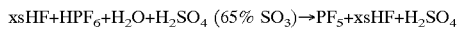
$$xsHF+HPF_6+H_2O+H_2SO_4 \; (65\% \; SO_3) \rightarrow PF_5+xsHF+H_2SO_4$$

coproducts
(1st rxn)

In a preferred operation of step one of the process, polyphosphoric acid (PPA) (equivalent to 117% orthophosphoric acid) is mixed in a closed system preferably under a dry atmosphere, such as nitrogen, dry air or argon at pressures less than 10 pounds per square inch with an excess of anhydrous hydrogen fluoride over the stoichiometric amount. It has been found when an excess of anhydrous hydrogen fluoride is added to a phosphoric acid over the amount theoretically required to form the hexafluorophosphoric acid ($HPF_6$), the yield of phosphorus pentafluoride increases in the subsequent reaction step with fuming sulfuric acid. The mixing can be achieved by adding anhydrous hydrogen fluoride to the polyphosphoric acid with adequate stirring and cooling. After the initial reaction, the polyphosphoric acid becomes fluid and it is then advantageous to maintain the viscous liquid polyphosphoric acid reaction medium below 25° C. during the mixing operation to yield the hexafluorophosphoric acid, in the excess and unreacted hydrogen fluoride and resultant water.

To the resulting liquid hexafluorophosphoric acid and excess and unreacted hydrogen fluoride, in the same reactor a stoichiometric amount of fuming sulfuric acid or oleum is gradually added with stirring while maintaining the temperature below 25° C.

A stoichiometric amount of (65% $SO_3$) fuming sulfuric acid which is added to the hexfluorophosphoric acid is represented by a weight ratio within the range of 1.0:1 to 1.8:1. Preferably, with a weight ratio of 1.3:1 after about sixty-five percent addition of the fuming sulfuric acid at 25° to 32° C. and at atmospheric pressure, phosphorus pentafluoride begins to evolve. Traces of phosphoryl trifluoride ($POF_3$) and hydrogen fluoride (HF) also begin to evolve at these conditions from the stirred liquid. The mixture of gases is then passed through a coding zone having a first cold trap, i.e., a fluorinated ethylene-propylene (FEP) tube maintained at temperatures of about 0° to 5° C. to condense gaseous materials such as hydrogen fluoride, sulfur trioxide and fluorosulfonic acid ($HSO_3F$). After the phosphorus pentafluoride passes through a first cold trap, it is directed to a second cold trap, i.e., another FEP tube cooled by a dry ice/acetone mixture and maintained at temperatures of about 0° to −80° C. and preferably about −70° to −80° C. to condense any phosphoryl trifluoride and other fluoride-phosphorus-sulfur impurities. There is less than 5% phosphoryl trifluoride found in the second cold trap. This recovered phosphoryl trifluoride can be reintroduced into the next production batch of hexafluorophosphoric acid. Following the completion of the addition of the fuming sulfuric acid, the temperature is gradually raised to about 180° C. with stirring to drive over the last traces of phosphorus pentafluoride. All of the phosphorus pentafluoride is evolved by about 160° to 170° C. Only a trace of phosphate was found in the acid bath after it was cooled, indicating that all the phosphorus pentafluoride had been evolved. The remaining sulfuric acid contains about 90% sulfuric acid/10% water after removal of the hydrogen fluoride and the phosphorus pentafluoride, with a small amount of fluorosulfonic acid ($HSO_3F$). This sulfuric acid is recyclable and could be mixed with sulfur trioxide to produce the fuming sulfuric acid as a reactant.

Alternatively, the above described process may be conducted with a single cold trap held at about −50 to −80° C.

As indicated above, instead of adding excess hydrogen fluoride during the preparation of hexafluorophosphoric acid with polyphosphoric acid, the distillate caught in the traps, particularly the first trap, can be added back in the preparation of the next batch of hexafluorophosphoric acid so that only 5 moles of a fresh feed of hydrogen fluoride are added with the rest of the hydrogen fluoride being recycled from the previous run.

The process of this invention may be conducted in either a batch or continuous operation. The equation for the preferred preparation:

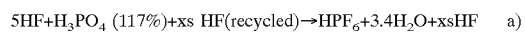
$$5HF+H_3PO_4 \; (117\%)+xs \; HF(recycled) \rightarrow HPF_6+3.4H_2O+xsHF \quad a)$$

($HPF_6$=70–72% based on P)
117%=ortho equivalent

The recycled hydrogen fluoride from a previous run is added in an amount equivalent to about one additional mole hydrogen fluoride plus a 25–50% overall excess. The concentration of hexafluorophosphoric acid is about 69 to 72 percent based on the phosphorus content.

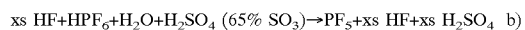
$$xs \; HF+HPF_6+H_2O+H_2SO_4 \; (65\% \; SO_3) \rightarrow PF_5+xs \; HF+xs \; H_2SO_4 \quad b)$$

coproducts
(step a)

Thus, overall equation for the reaction according to the invention is as follows:

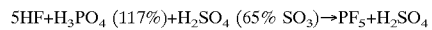
$$5HF+H_3PO_4 \; (117\%)+H_2SO_4 \; (65\% \; SO_3) \rightarrow PF_5+H_2SO_4$$

In the above equation, all the hydrogen fluoride is consumed and essentially the only fluorine-containing final product is phosphorus pentafluoride. As mentioned hereinbefore, there is less than 5 percent phosphoryl trifluoride found in the second cold trap which can be re-introduced into the reactor along with hydrogen fluoride at the beginning of the next run. Thus, the overall process according to this invention uses only stoichiometric amounts of hydrogen fluoride and fuming sulfuric acid while achieving consistently high yields (65–100%) of phosphorus pentafluoride (based on phosphorus used) and producing a recyclable grade of sulfuric acid. There is virtually no waste in the process. The resulting purified phosphorus pentafluoride was trapped in diethyl ether at 0° C. and ambient pressure and weighed. It can be used directly or condensed into gas cylinders for distribution.

While the first reaction step produces a more concentrated hexafluorophosphoric acid (70–72%) $HPF_6$, (coproduct 28–30% $H_2O$), which is the preferred intermediate material, commercial hexafluorophosphoric acid (60–68%) may also be used as a starting material for preparing phosphorus pentafluoride in a reaction medium comprising excess hydrogen fluoride.

Polyphosphoric acid, the preferred acid useful in this invention, may be prepared by heating $H_3PO_4$ with sufficient phosphoric anhydride to give the resulting product of about 82–85% ($P_2O_5$), 80–130% ortho equivalent. It is a viscous liquid at room temperatures and conveniently fluid at 60° C. Thus, it is easier to handle and to react than orthophosphoric acid. The preferred equivalent concentration of $H_3PO_4$ in the polyphosphoric acid is 102–130% by weight. Ortho phosphoric acid may also be used. The orthophosphoric acid may be furnace acid or wet process phosphoric acid and it is preferred to employ phosphoric acid containing about 65–82 weight percent $P_2O_5$ or more on an analysis basis. A preferred range is from about 70–72 weight percent $P_2O_5$.

The hexafluorophosphoric acid is preferably produced from the reaction of polyphosphoric acid with an excess of anhydrous hydrogen fluoride, and since less water by-product is formed, it is more concentrated, i.e., 70–72 weight percent. The excess amount of anhydrous hydrogen fluoride may range from about 7 to 100 weight percent based on the amount of hexafluorophosphoric acid, which in turn is based on the phosphorus content of the acid. Preferably, hydrogen fluoride comprises from 20 to about 100 weight percent and most preferably 45 to about 100 weight percent.

Fuming sulfuric acid designated in commerce as oleum is prepared by dissolving sulfur trioxide in sulfuric acid. Preferably the fuming sulfuric acid contains up to about 80% by weight free sulfur trioxide, preferably from 5 to 80% and most preferably about 65%. Pure sulfur trioxide per se can also be used.

Stoichiometrically the weight ratio of fuming sulfuric acid (65% $SO_3$) to hexafluorophosphoric acid (70% to 72%) ranges from about 1.0:1 to 1.9:1 and preferably from 1.2:1 to 1.5:1. Less than a stoichiometric amount of sulfur trioxide may be used in about 50% to 95% of the stoichiometry required, the preferred range is 55% to 75%, and the most preferred range is 60% to 70%.

Fluorosulfonic acid ($HSO_3F$) which is more acidic than 100% sulfuric acid may be employed at a weight ratio to hexaflurophosphoric of about 0.1:1 to 1.4:1 and preferably 0.9:1 to 1.2:1. The unreacted fluorosulfonic acid may be recycled as make-up to the next process run.

The following examples are illustrative of the practice of the method of the present invention. It will be understood, however, that is not to be construed in any way limitative of the full scope of the invention, since various changes can be made without departing from the spirit of the teachings contained herein in light of the guiding principles which have been set forth above.

EXAMPLE 1

First Step
Preparation of Hexafluorophosphoric Acid

To a closed TEFLON lined reactor under inert atmosphere below 10 psi. were added 790 g. (9.4 moles) warm polyphosphoric acid (117% $H_3PO_4$ content) then 1235 g. (61.7 moles) liquid anhydrous HF were added with stirring and cooling while maintaining the temperature below 25° C. The addition took two hours and produced a water white solution. The solution contained 67.3% hexaflurophosphoric acid (measured as phosphate) and 9% excess HF based on HF added.

Second Step
Preparation of Phosphorus Pentafluoride (9% Excess HF.)

Into the same reactor to the solution from the first step containing 1008 g. $HPF_6$ (4.69 moles) (70% $HPF_6$/16.7 moles 30% $H_2O$, were added 1595 g. (13.0 moles) fuming sulfuric acid (65% $SO_3$) while stirring and cooling to maintain the temperature below 32° C. The addition required 3 hours and the $PF_5$ generated was passed first through an ice trap (0° to 4° C.), a dry ice trap (−76° to −78° C.) and then caught in a preweighed 688 g. cold diethyl ether solution under argon. After the addition was completed, the acid reactor was gradually heated to about 151° C. to drive all of the HF and $PF_5$ from the acid reaction solution.

The diethyl ether was reweighed after the reaction was completed and found to have trapped 377 g. $PF_5$ as the etherate. The yield was 65.2% wt, (based on phosphorus content). The process also produced 223 g. HF distillate and 25 g as $POF_3$.

EXAMPLE 2

25% Excess HF Added

To 1044 g. (5.0 moles) of the 70% $HPF_6$ solution prepared according to the first step described in Example 1, were added 150 g. liquid anhydrous HF to provide a 25% excess of HF in the solution. To this mixture were slowly added 1781 g. (14.5 moles) fuming sulfuric acid (65% $SO_3$) over three hours maintaining the temperature below 32° C. The $PF_5$ was passed through series of traps and into preweighed cold ether as described. After the addition was completed, the temperature was gradually raised to 152° C. to drive the excess HF to the traps. The recovered $PF_5$ weighed 512 g which corresponds to a yield of 83 wt. %. A total of 278 g. of HF distillate from the traps was collected for use in the next run.

EXAMPLE 3

Addition of Previous Run HF Distillate (Equivalent to About 49% HF Excess)

The 278 g. HF distillate from the ice traps in Example 2 is added to 993 g. (7.6 moles) 70% $HPF_6$ as prepared in the first step of Example 1 with cooling to maintain the temperature below 25° C. Then 1587 g. (12.9) fuming sulfuric acid (65% $SO_3$) were added over three hours while maintaining the temperature of the solution under 32° C. When the addition was completed, the $PF_5$ was treated as before and trapped in cold diethyl ether. The yield was 580 g. which is 99 wt. %. The HF distillate weighed about 280 g. and could be recycled into the next run.

EXAMPLE 4

Added 316 g HF distillate from previous runs to 1003 g. 70% $HPF_6$ prepared as in Example I. Then added 1306 g. fuming sulfuric acid (65% $SO_3$) were added to the solution slowly maintaining temperature below 29° C. The solution was warmed up to 155° C. The $PF_5$ and HF gases were passed through the ice trap and dry ice traps as in previous examples. The $PF_5$ was trapped in 723 g. diethyl ether at 0° C. The net weight of pure $PF_5$ was 566 g. (or 96 wt. % yield) about 30 g. $POF_3$ and 364 g HF distillate.

EXAMPLE 5

Added 1046 g. fluorosulfonic acid to 1002 g. hexafluorophosphoric acid (70%) prepared as in Example 1 with strong cooling. (The HFPA contained 7% excess of HF.) The temperature was maintained below 33° C. After the addition was complete, the temperature was raised to 155° C. to remove all the $PF_5$ product. The gases were passed through a –78° C. trap to purify the $PF_5$ which was caught in 750 g. cold diethyl ether under inert atmosphere. The yield of $PF_5$ was 620 g. for a yield based on phosphorus added to the system of 98%.

Comparative Example A
3% Excess HF

Added 1527 g. 65% oleum slowly to 1009 g. hexafluorophosphoric acid (70%) prepared as in Example 1 with cooling. (The $HPF_6$ contained a 3% excess of HF.) The temperature was maintained below 33° C. There was 3% excess of HF in the HFPA. After the addition was complete, the temperature was raised to 155° C. to remove all the product. The gases were passed through the cooling traps to purify the $PF_5$ which was caught in 720 g. cold ether under inert atmosphere. The yield of $PF_5$ was 346 g. for a yield based on contained phosphorus of 55 wt. %.

Comparative Example B
17% Deficiency HF

Added 1730 g. of 65% oleum to 984 g. $HPF_6$ made with 17% deficiency of HF, keeping the temperature below 40° C. The gases were purified in the usual manner and the temperature of the reaction raised to 155° C. after the addition was complete. The product was trapped in 698 g. ether. 237 g. of $PF_5$ were recovered for a yield of 37 wt. %.

The FIGURE is based on the data generated by the above examples shows that the yield of high purity phosphorus pentafluoride (based on phosphorus used) is directly related to the amount of excess anhydrous hydrogen fluoride in the reaction medium involving hexafluorophosphoric acid with the fuming sulfuric acid as the reactants. Such reaction medium comprises at least 9 weight percent (based on the amount of $HPF_6$) anhydrous hydrogen fluoride, and preferably from 20 to 100 weight percent and most preferably from 45 to 100 weight percent. This weight percent is based on the amount of $HPF_6$ (based on the P) used in the reaction.

While in the foregoing specification we have set out specific procedures in considerable detail for the purpose of illustrating embodiments of the invention, it will be understood that such details may be varied widely by those skilled in the art without departing from the spirit of our invention.

What is claimed is:

1. A process for preparing phosphorus pentafluoride which comprises effecting reaction of hexafluorophosphoric acid with a sulfur based acid reactant selected from the group consisting of fuming sulfuric acid, sulfur trioxide, fluorosulfonic acid and mixtures thereof in a reaction medium containing an excess amount of hydrogen fluoride over the amount of anhydrous hydrogen fluoride in the reaction medium.

2. The process of claim 1 wherein said reaction medium comprises at least 7 weight percent excess over the stoichiometric amount of hydrogen fluoride based on the amount of contained hexafluorophosphoric acid.

3. The process of claim 2 wherein said excess of the stoichiometric amount of hydrogen fluoride ranges from 20 to 100 weight percent.

4. The process of claim 1 wherein said amount of a sulfur based acid reactant is reacted with phosphorus pentafluoride in less than a stoichiometric amount.

5. The process of claim 4 wherein a sulfur based acid reactant amount ranges from 50 to 95% of the required stoichiometry.

6. The process of claim 1 comprising the steps of:
   a) adding said sulfur based acid reactant to hexafluorophosphoric acid at temperatures maintained below 32° C. in a liquid reaction medium comprising at least 7 weight percent excess amount of liquid anhydrous hydrogen fluoride to begin evolving gaseous reaction products containing phosphorus pentafluoride;
   b) increasing the reaction temperature upon completion of the addition of the sulfur based acid reactant to evolve a gaseous mixture of phosphorus pentafluoride, hydrogen fluoride and phosphoryl trifluoride;
   c) passing the gaseous mixture containing phosphorus pentafluoride, hydrogen fluoride and phosphoryl trifluoride through a cooling zone having a first cooling sector maintained between about 0° to 5° C., and a second cooling sector maintained between about –60° to –80° C. to separate the phosphorus pentafluoride from hydrogen fluoride, phosphoryl trifluoride and entrained sulfur compounds; and
   d) recovering substantially pure phosphorus pentafluoride, hydrogen fluoride and sulfuric acid.

7. The process of claim 6 wherein said reaction medium comprises from 25–100 weight percent excess hydrogen fluoride based on contained hexafluorophosphoric acid.

8. A process for preparing phosphorus pentafluoride comprising the steps of:
   a) adding a stoichiometric excess of anhydrous hydrogen fluoride to a phosphoric acid to form hexafluorophosphoric acid and hydrogen fluoride;
   b) reacting the hexafluorophosphoric acid with fuming sulfuric acid or sulfur trioxide in contact with any unreacted hydrogen fluoride at a temperature below 25° C. to produce a gaseous stream consisting substantially of phosphorus pentafluoride, and then
   c) recovering phosphorus pentafluoride, any hydrogen fluoride and sulfuric acid.

9. The process of claim 8 wherein the temperature in step c) is gradually increased to about 180° C.

10. The process of claim 8 wherein said gaseous stream is passed through a cooling zone maintained in the range of about –50 to –80° C. temperatures.

11. The process of claim 8 including passing the gases (from step b) through a cooling zone to condense any impurities except phosphorus pentafluoride from other gaseous materials wherein said cooling zone comprises a first cooling sector maintained from about 0° to 5° C. and a second cooling sector is maintained from –40° to –80° C.

12. The process of claim 8 wherein any excess hydrogen fluoride recovered from step c) is reintroduced to step a) to provide the desired hydrogen fluoride.

13. The process of claim 8 further comprising the step of passing phosphorus pentafluoride into an ether solution.

14. The process of claim 8 wherein said fuming sulfuric acid contains from 5 to 80 weight percent sulfur trioxide.

15. The process of claim 8 wherein said phosphoric acid is a polyphosphoric acid which contains 102% to 130% equivalent concentration of $H_3PO_4$.

16. The process of claim 8 wherein said phosphoric acid is orthophosphoric acid.

17. A process for preparing phosphorus pentafluoride comprising the steps of:

a) reacting polyphosphoric acid in excess of anhydrous hydrogen fluoride to form a solution of hexafluorophosphoric acid containing unreacted hydrogen fluoride at a reaction temperature below 32° C.;

b) adding a sulfur based acid selected from the group consisting of fuming sulfuric acid, sulfur trioxide, fluorosulfonic acid and mixtures thereof to said solution of hexafluorophosphoric acid while maintaining the reaction temperature below 32° C. to begin evolving gaseous phosphorus pentafluoride;

c) increasing the reaction temperature upon completion of the sulphur based acid addition to evolve a gaseous mixture of phosphorus pentafluoride, hydrogen fluoride and phosphoryl trifluoride;

d) passing the gaseous mixture of step c) through a cooling zone comprising a first sector maintained at about 0° to 5° C. and a second sector at about −60° to −80° C. to separate phosphorus pentafluoride from any hydrogen fluoride, phosphoryl trifluoride and entrained sulfur compounds;

e) reintroducing any recovered hydrogen fluoride into step a) separately, in a subsequent run and then f) recovering substantially pure phosphorus pentafluoride, any hydrogen fluoride, and sulfuric acid.

18. The process of claim 8 which comprises the steps of:

a) reacting polyphosphoric acid with about 9 to 100 weight percent stoichiometric excess of anhydrous hydrogen fluoride at a reaction temperature below 32° to form a solution of hexafluorphosphoric acid with excess hydrogen fluoride;

b) adding fuming sulfuric acid to the solution of hexafluorophosphoric acid in a weight ratio ranging from about 1.0:1 to 1.8:1 while maintaining the temperature below 32° C.;

c) increasing the temperature upon completion of the fuming sulfuric acid addition to about 180° C.;

d) passing an evolving gaseous stream through a plurality of cooling zones to separate gaseous phosphorus pentafluoride from any recovered hydrogen fluoride, phosphorus trifluoride, and entrained sulfur compounds; and then;

e) recovering substantially pure phosphorus pentafluoride.

* * * * *